United States Patent [19]

Bettle, III et al.

[11] Patent Number: 4,977,004
[45] Date of Patent: * Dec. 11, 1990

[54] BARRIER STRUCTURE FOR FOOD PACKAGES

[75] Inventors: Griscom Bettle, III, Sarasota; Christopher W. Gargano, Bradenton, both of Fla.

[73] Assignee: Tropicana Products, Inc., Bradenton, Fla.

[*] Notice: The portion of the term of this patent subsequent to Jan. 16, 2007 has been disclaimed.

[21] Appl. No.: 259,594

[22] Filed: Oct. 19, 1988

Related U.S. Application Data

[62] Division of Ser. No. 101,730, Sep. 28, 1987, Pat. No. 4,894,267.

[51] Int. Cl.⁵ .................. B65D 65/38; B65D 15/22; B32B 1/02; B32B 27/06
[52] U.S. Cl. .................. 428/36.7; 428/36.6; 428/34.3; 428/412; 428/483; 428/516; 428/520; 428/2; 426/127; 229/3.1; 229/3.5 R; 264/513; 264/515
[58] Field of Search ............... 428/35, 412, 516, 483, 428/520, 34.3, 36.7, 36.3

[56] References Cited

U.S. PATENT DOCUMENTS 4,064,296 12/1977 Bornstein .................. 428/35
4,701,360 10/1987 Gibbons et al. .............. 428/35
4,894,267 1/1990 Bettle, III et al. ............ 428/516

*Primary Examiner*—P. C. Sluby
*Attorney, Agent, or Firm*—Cook, Egan, McFarron & Manzo, Ltd.

[57] ABSTRACT

A barrier structure liner for food packages comprises two layers of EVOH (ethylene-vinly alcohol copolymers), one of which is interposed between two moisture barriers. The inner layer of EVOH (in contact with the packaged food) functions as a solvent barrier which reduces the loss of flavor components from the foods, while the buried EVOH layer, protected from moisture from the packaged food and the outside atmosphere, serves as an oxygen barrier to prevent oxygen from outside the package from oxidizing the foods within the container. The barrier structure may be used in paper cartons, plastic bottles, bags and the like.

5 Claims, 4 Drawing Sheets

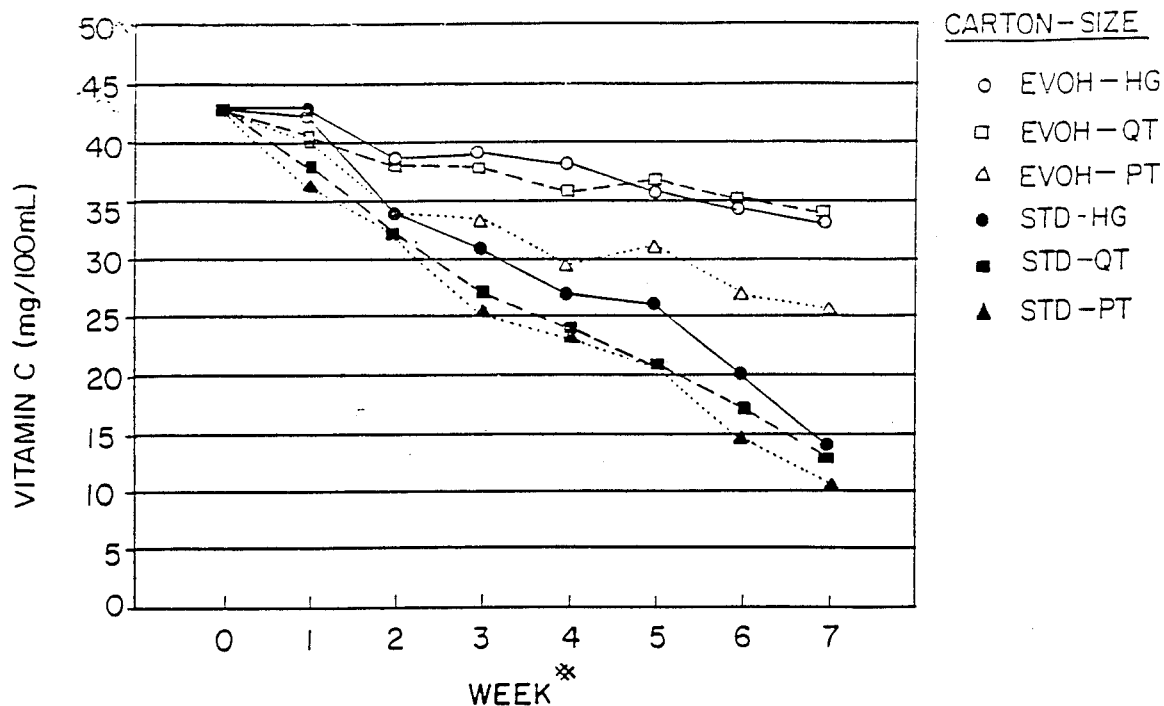
FIG. 5 VITAMIN C – 35 F ORANGE JUICE STANDARD vs. DUAL LAYER EVOH
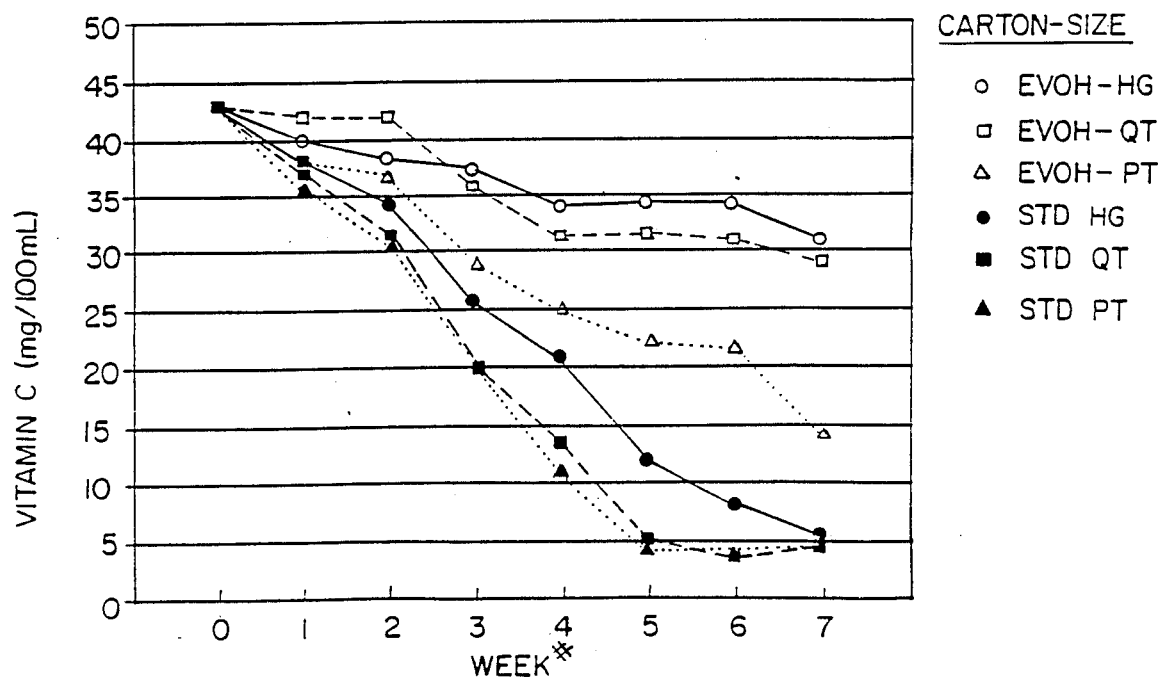
FIG. 6 VITAMIN C 45 F ORANGE JUICE STANDARD vs. DUAL LAYER EVOH

BARRIER STRUCTURE FOR FOOD PACKAGES

This is a division, of application Ser. No. 101,730, filed Sept. 28, 1987, now U.S. Pat. No. 4,894,267.

The present invention relates to a barrier structure for food packages which provides the package with reduced oxygen migration into the packaged food and reduced flavor loss from the packaged food, and thus provides a package which provides excellent flavor preservation and extended shelf life for packaged food products. The barrier structure of the present invention may be used in a variety of packages, including paper cartons, plastic bottles, bags and the like. The barrier structure for the food package of the present invention is heat-sealable, thus providing for facile conversion of the barrier structure into cartons and similar food retaining packages which require heat sealing. The barrier structure of the present invention is particularly useful in packaging orange juice.

DESCRIPTION OF THE PRIOR ART

Glass provides a technically superior packaging material for food products, because it is impervious to oxygen migration from air through the container into the packaged food and is impervious to the migration of flavor components out of the packaged food product into the container. However, glass is subject to breakage. When the glass is made thick enough to resist breakage, the resulting package is relatively heavy and consequently it is expensive to ship.

Paper structures are widely used as packaging materials for foods, including liquid foods, because they are lightweight and inexpensive and they can be easily disposed of by incineration or the like. Although paper substrates have relatively good shape retaining proprties, they have relatively high water permeability. Accordingly, it is common practice to combine a paper board substrate with a film of thermoplastic resin, such as polyethylene which is applied to the inner and outer surfaces of the board.

Conventional orange juice cartons, which are paper board lined with low-density polyethylene layers, have problems with "flavor scalping". Flavor scalping occurs when orange oil in orange juice is absorbed into the polyethylene layer. The orange oil carries with it certain oil soluble flavor components from the orange juice. Other flavor components are not absorbed by the polyethylene layer and remain in the orange juice. As a result, the orange juice in a conventional package develops an unbalanced "off" flavor which cannot be restored to the "as made" flavor merely by the addition of more orange oil to the packaged juice. The prior art has not addressed this flavor scalping problem.

Moreover, the prior art structures have been troubled with oxygen, from the air, penetrating the package to oxidize the foods therein. In the case of orange juice, oxygen degrades the Vitamin C. As a result, paper thermoplastic laminates are sometimes provided with a layer of a material having good gas barrier properties, such as aluminum foil.

Although aluminum foil provides a structure which has a good gas barrier, it has a tendency to develop pinhole leaks at the corners during shipping and thus lose its gas barrier properties. Moreover, metal foils are expensive, which limits their use for many commercial purposes. Certain other thermoplastic resins, such as Saran (polyvinylidine chloride) provide good oxygen-impermeability, but are also expensive and may have incineration problems. More importantly, they are hard to heat-seal. Nylon is a good solvent barrier, but it is not currently approved for use in food packages and nylon is also prohibitively expensive and hard to seal. Many other thermoplastic materials, while providing some oxygen barrier properties, absorb oils from the packaged food products. The absorbed oils carry flavor components with them, and thus flavor elements of the packaged food are lost into the package.

Although laminates of thermoplastic films and paper have been somewhat successful in reducing the permeation of gas and water through the walls of the package, they have not solved the flavor scalping problems. When different combinations of thermoplastic resins are applied to paper substrates, the heat-sealability is enhanced, but the gas permeability, and particularly the oxygen permeability is marginal, thus limiting the use of such prior art structures to foods and beverages which do not oxidize rapidly.

A number of prior art workers have addressed the problem of oxygen permeability in low cost food packages. A number of prior art workers have observed that EVOH (copolymers of ethylene and vinyl alcohol) have good oxygen barrier properties if used in layers of substantial thickness.

The following patents disclose multi-layer packaging material which includes at least one layer containing an ethylene-vinyl alcohol copolymer:

U.S. Pat. No. 3,620,435
U.S. Pat. No. 4,421,823
U.S. Pat. No. 4,526,823
U.S. Pat. No. 4,551,366
U.S. Pat. No. 4,557,780
U.S. Pat. No. 4,608,286.

The materials described by these prior art workers have only limited oxygen non-permeability and only limited flavor retention properties.

SUMMARY OF THE INVENTION

The present invention provides a barrier structure adapted to be fabricated into packages for foods to produce packages which are economical, but which are at least equal to the prior art structures with respect to oxygen permeability and which overcome the flavor loss (i.e., scalping) problems and heat-sealing and other problems associated with the prior art structures.

In its broadest embodiment, the barrier structure of the present invention comprises two relatively thin layers of EVOH, one of which is interposed between two moisture barrier layers. The barrier structure is fabricated into packages, whereby one layer of EVOH is in contact with the packaged product (i.e., the inner layer), and the other EVOH layer (i.e., the buried layer) is separated from the packaged product by a first moisture barrier layer and from the outside atmosphere by a second moisture barrier. In some cases, structural layers of the package may provide the required moisture barrier for the barrier structure of the present invention.

The barrier structure of the present invention may be used in several different embodiments of food packages.

In one embodiment, the barrier structure of the present invention is incorporated into a paper carton which comprises a layer of fiber, such as milk board or juice board. The fiber layers of the juice board give structural substance to the carton, while the barrier structure of the present invention provides a superior oxygen barrier and superior flavor retaining properties. In the paper carton embodiment, the package may comprise a laminated structure having six layers which are as follows:
Low-density polyethylene;
Fiber;
Low-density polyethylene;
Ethylene-vinyl alcohol copolymer;
Coextrudible adhesive layer;
Ethylene-vinyl alcohol copolymer.

In another embodiment, the barrier structure of the present invention may be incorporated into a plastic bottle using commercially available coextrusion blow molding techniques. In the plastic bottle embodiment, the bottle wall may comprise seven layers, which are as follows:
High-density polyethylene;
Adhesive;
Ethylene-vinyl alcohol copolymer;
Adhesive;
Regrind;
Adhesive;
Ethylene-vinyl alcohol copolymer.

BRIEF DESCRIPTION OF THE DRAWINGS

FIG. 5 is a graph of Vitamin C content of orange juice stored in paper cartons at 35° F. for seven weeks;

FIG. 6 is a graph of the Vitamin C of orange juice stored in paper cartons at 45° F. for seven weeks.

DETAILED DESCRIPTION OF THE PREFERRED EMBODIMENTS

Figure 1:
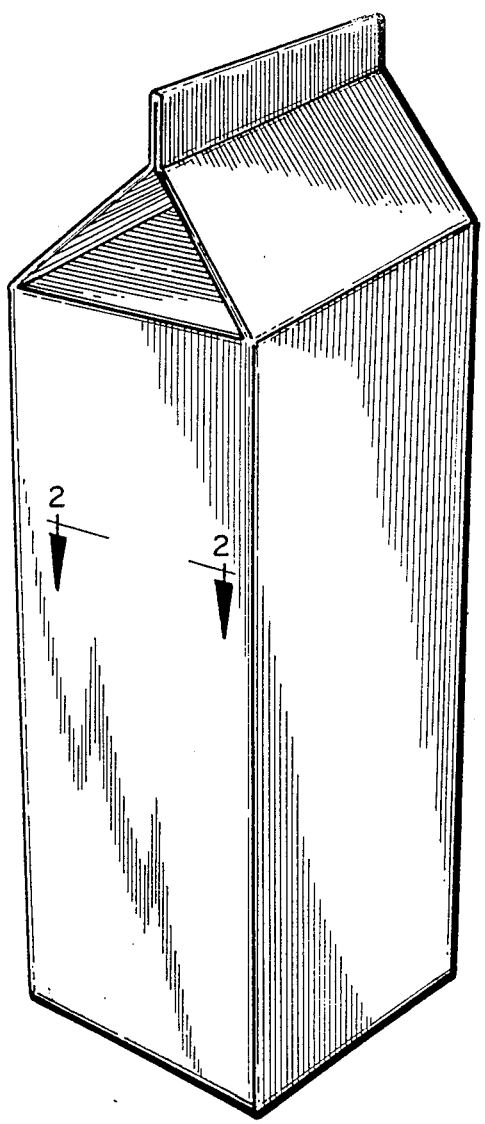
FIG. 1 is a perspective view of a typical paper carton food package.

It has been discovered that a barrier structure of two relatively thin ethylene-vinyl alcohol copolymer layers which have a moisture barrier layer therebetween and a moisture barrier between the outside atmosphere and the ethylene-vinyl alcohol copolymer layer may be used in a variety of food packages to provide a superior oxygen non-permeability and superior flavor retention package. The oxygen non-permeability of the barrier structure of the present invention is at least equal to a single EVOH layer having the same amount of buried EVOH. The flavor retention provided by the barrier structure is superior to any other non-glass packaging material of comparable total cost.

The present invention contemplates that the improved barrier structure may be laminated, coextruded, thermoformed or otherwise affixed to a variety of packaging material, including conventional high-density polyethylene bottles and paperboard which is sandwiched between two layers of low-density polyethylene. The following description is presented in the context of a package for orange juice, but other foods and non-foods may be advantageously packaged using the barrier structure of the present invention.

EVOH

The barrier structure of the present invention requires two layers of ethylene-vinyl alcohol copolymers (sometimes referred to as EVOH). The use of the two EVOH layers is essential to provide oxygen impermeability and preserve the Vitamin C content (which is destroyed by oxygen) of orange juice and to prevent loss of flavor and taste components of the orange juice. It has been found that separating one layer of the EVOH from the juice to create a "buried" EVOH layer and providing a moisture barrier between the juice and the buried EVOH layer produces a structure having superior oxygen impermeability. To achieve the best oxygen barrier, it is important that the buried EVOH layer be bone dry and insulated from any moisture inside or outside of the package. Accordingly, a moisture barrier must be interposed between the buried EVOH layer and the outside atmosphere.

The inner layer, i.e., the EVOH layer which is in contact with the food, functions as a sacrificial layer insofar as it does not contribute as significantly as the buried layer to the oxygen impermeability. It has been found that EVOH does not scalp flavors, i.e., it does not absorb significant quantities of oils from orange juice or other products. Because the EVOH does not absorb the oils from orange juice, the orange juice does not take on an unbalanced "off" flavor, but retains all of the flavor components which are essential to get "fresh" juice flavor. The EVOH inner layer functions as an oil barrier, and thus provides a package which has superior flavor and taste retention properties.

The ethylene-vinyl alcohol copolymer used in the present invention is a copolymer obtained by converting a substantial percentage of the vinyl acetate units in an ethylene-vinyl acetate copolymer to vinyl alcohol units. Generally such copolymers comprise 30 to 60 mole percent of ethylene and 40 to 70 mole percent of vinyl acetate, of which 90% or 95% are converted to vinyl alcohol units by saponification. The ethylene-vinyl alcohol copolymer used in the barrier structure of the present invention preferably has an ethylene content of about 30 to about 60 mole percent, and most preferably about 44 mole percent with a saponification degree of at least 90%, and preferably at least 95%. When the ethylene content is less than about 30%, it is very difficult to prepare a container by laminating the copolymer to polyethylene because of the increase of the softening temperature which enlarges the difference from the softening temperature of other thermoplastics conventionally used in food packages. When the ethylene content is more than about 60 mole percent, the oxygen permeability increases so that the favorable characteristics of the ethylene-vinyl alcohol copolymer are lost. When the conversion rate (equal to the saponification degree) of the vinyl acetate unit into the vinyl alcohol unit is less than 95%, the hygroscopic quality increases and the oxygen impermeability under high humidity is lower.

The EVOH typically has a molecular weight in the range of about 20,000–30,000 and a melting point temperature of about 325°–375° F. These characteristics correspond roughly to melt indices of about 9 to 1.5. The melt index values herein are determined in accordance with ASTM test D-1238, procedure EE or L using a weight of 260 grams and a temperature of either 190° or 210° C. as appropriate. Typically the EVOH has a density of 1.1 to 1.2. Suitable temperatures for processing EVOH is about 400°–480° F. and preferably 410°–440° F. While the degradation temperature of EVOH is generally regarded to be about 450°, this is not inconsistent with the higher processing temperatures described herein, due to the short residence time of the extrusion process. Illustrative of EVOH resins that are suitable for use are EVAL E containing about 44 mole percent of polyethylene and/or EVAL F containing about 32 mole percent polyethylene, available from Kuraray. Additionally, EVOH resins available from Dupont and from Nippon Goshei, of Japan, may be used. EP-E and EP-F, available from Kuraray, contain about 55% and 68% vinyl alcohol, respectively, in the molecule and have melt flow values, as determined, at 190° C. of 5.8 and 1.5, respectively. SOAR NOL-D, SOAR NOL-E and SOAR NOL-ET, available from Nippon Goshei, contain 71%, 62% and 62% vinyl alcohol, respectively, and exhibit flow melt values of 7.4, 8.0 and 3.5, respectively, as determined at 210° C.

It is essential that each layer of EVOH be a monolithic structure which is devoid of pinholes, tears and the like. Because the barrier structures of the present invention undergo fabrication processes wherein the barrier structure is positioned within the food package, it is necessary that the EVOH layers be sufficiently thick to create a monolithic structure in the fabricated, filled and shipped package. Generally speaking, EVOH layers having a thickness of approximately 0.1 mils have been found to be adequate for many purposes. However, due to difficulty in measuring such thicknesses, the EVOH layers are generally expressed in pounds of copolymer per 3,000 square feet of coated surface. Specifically, it has been found that EVOH layers having between 2.5 and 5 pounds per 3,000 square feet and preferably 3 and 4 pounds per 3,000 square feet produce a barrier structure which is useful in juice board cartons. For coextruded-blow molded bottles, somewhat greater EVOH thicknesses are preferred.

The oxygen permeability of the buried EVOH layer in the barrier structure of the present invention is affected significantly by the temperature at which the food is stored, wherein the permeability increases with increasing temperature. In the Examples given below, the "buried" EVOH layer illustrated is preferably about 2.5 pounds per 3,000 square feet when used for packages designed for storage of orange juice at temperatures of no higher than about 45° F. For a package designed to store or contain orange juice at room temperature, it would be desirable to increase the thickness of the buried EVOH layer to 5 or more pounds per 3,000 square feet, although this adds to the cost of the package.

The oil solubility of the inner EVOH layer, however, is not dramatically affected by the temperature in packages designed to store foods of up to 12 weeks or so. Accordingly, it is contemplated that the inner EVOH layer may be relatively thin, e.g., 2.5 to 5 pounds per 3,000 square feet, even in packages designed for room temperature storage.

The ethylene-vinyl alcohol copolymer may also comprise as a comonomer, other olefins such as propylene, butene-1, pentene-1 or 4-methyl pentene-1 in such an amount as not changing the inherent properties of the copolymer, that is, in an amount of up to about 5 mole percent based on the total of copolymer.

In the present invention, ethylene-vinyl alcohol copolymers of the above mentioned type may be used singly or in the form of a mixture of two or more EVOH copolymers.

The present invention contemplates inclusion of a nylon (polyamid) in either of the EVOH layers to impart the property of toughness to the film, while reducing the amount of the more expensive EVOH which is used. Structural properties improve toughness of this layer are discernible with as little as 10% by weight of the nylon, based on weight of the total layer composition. Further, the ethylene-vinyl alcohol copolymer may be mixed with a polyamide in order to enhance the fabricating properties of the ethylene-vinyl alcohol copolymer. It is generally preferred to use a minor amount of the polyamid in the mixture.

If the EVOH is blended with a polyamid polymer, it is desirable to have more than 50% EVOH in the composition in order to impart the necessary oxygen barrier property generally associated with EVOH. Increased oxygen barrier properties are achieved as the EVOH percentage is increased up to 90%. Generally blends of EVOH and polyamids are used. It is preferred that the blends comprise 70–90% EVOH.

MOISTURE BARRIER LAYERS

The function of the moisture barriers is to prevent the migration of moisture from the packaged food product into the packaging material and prevent the migration from outside the package (or from the outer layers of the package) into the barrier layer, and specifically, to insulate the buried EVOH layer from moisture. Accordingly, the moisture barrier layers must be monolithic structures which maintain their integrity during the process by which the barrier structure is converted into a package.

Figure 2:
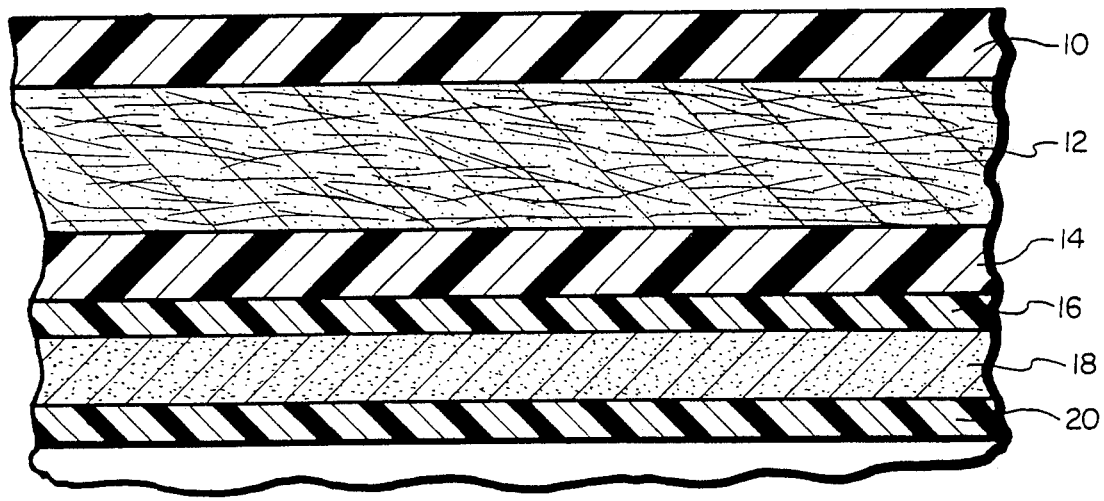
FIG. 2 is a cross-section of the carton wall, taken at section 2—2 of FIG. 1, of a paper carton showing the barrier structure of the present invention incorporated into a six layer package wall.

The present invention contemplates several embodiments of the moisture barrier layer. In one embodiment, an adhesive layer, which has moisture barrier properties and which has EVOH adhesive properties, is used as a single layer separating the two EVOH layers. A structure of this type is illustrated in FIG. 2, wherein the low-density polyethylene (LDPE) between the fiber layer and the buried EVOH layer functions as the outside moisture barrier.

Figure 4:
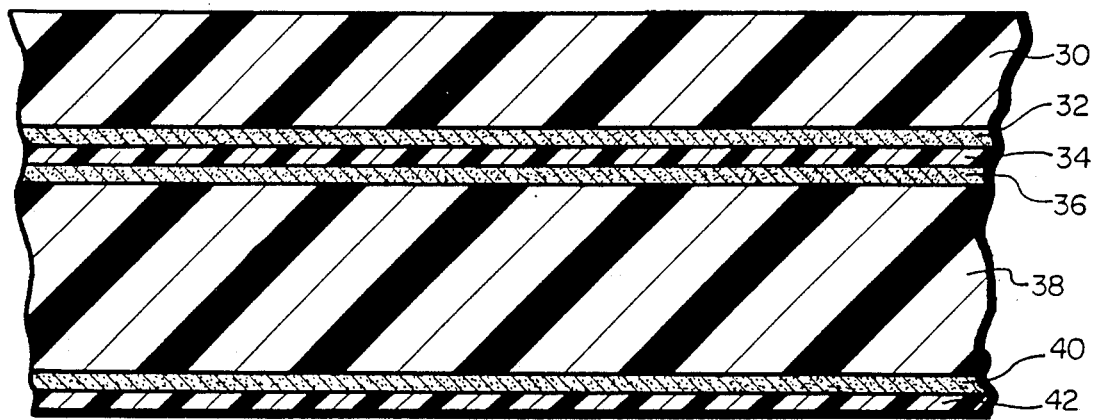
FIG. 4 is a cross-section of the bottle wall, taken at 4—4 of FIG. 3, of a blow molded plastic bottle showing the barrier structure of the present invention incorporated into a seven layer wall.

In another embodiment, the moisture barrier may be high-density polyethylene (HDPE) which is secured between the two EVOH layers by adhesives applied to both sides of the high-density polyethylene. In such cases, the adhesive layers need not have any moisture barrier qualities, but need only have adhesive qualities which will secure the EVOH layers to the intermediate moisture barrier layer. In this embodiment, the moisture barrier layer may comprise reground high-density polyethylene (regrind) taken from scrap created during the blow molding process. The use of regrind is advantageous in that it contains a certain level of EVOH presence. It functions not only as a moisture barrier, but provides structural rigidity to the resulting package. A moisture barrier of this embodiment is illustrated in FIG. 4.

If the moisture barrier layer is used as the adhesive to join the two EVOH layers, it must have good adhesive properties, in addition to functioning as a moisture barrier. As is mentioned above, the oxygen barrier function of the EVOH layer is materially enhanced if the EVOH is absolutely dry, i.e., it is free from all moisture. Additionally, the adhesive must form a tight seal between the two EVOH layers so that any leakage through either of the EVOH layers.

In order to facilitate the package manufacture, the adhesive layer is preferably a coextrudable adhesive. The thickness of the adhesive is not critical to the oxygen barrier or flavor preservation as long as the buried EVOH layer is kept dry, but adhesive thickness may impact upon the structural aspects of the package. In juice board packages of the type shown in FIGS. 1 and 2, adhesive layers using about 10 pounds per 3,000 square feet have been used. Such adhesive layers may be 7 microns in thickness, by way of example. A variety of adhesives may be used. The adhesive layer may comprise a modified ethylene-vinyl acetate copolymer having a vinyl acetate content of from about 20% to about 40% modified with up to about 2% by weight of maleic anhydride and having a melt index of 1.5 to 2 grams per 10 minutes. Adhesives designed to adhere the EVOH to low-density polyethylene may comprise a low-density polyethylene which is chemically modified to insert functional groups on the polymer chains which bond to polar substrates such as EVOH. A family of adhesives, which are chemically modified polymeric resins, are available under the name Plexar from USI Chemicals Co. Division of National Distillers and Chemical Corp.

JUICE BOARD CARTONS

A juice board carton embodying the barrier structure of the present invention is illustrated in FIGS. 1 and 2. In FIG. 2, the juice board comprises fiber layer 12 which is sandwiched between low-density polyethylene layers 10 and 14. The barrier structure, which is laminated or coextruded to the juice board, comprises the buried EVOH layer 16 which is joined by adhesive 18 to the inner EVOH layer 20.

In the paper carton embodiment, the preferred paper structure is known as "juice board" in the industry. Basically, it is a paper fiber board with a sizing to provide enhanced wet strength. Similar board structures are known as milk board and the like. Generally it is preferred that the juice board be used at from about 215 pounds to about 282 pounds per 3,000 square feet. Paperboard with greater or lesser weights could obviously be used. Those skilled in the art will understand the changes to the overall package which will be affected by changing the paper weight. The primary function of the fiber is to provide structural rigidity of the package, as distinguished from oxygen barrier or flavor barrier properties.

In the juice board embodiment, as is shown in FIGS. 1 and 2, the fiber board is laminated between two films of low-density polyethylene. It has been found that juice board laminated between films containing 12 pounds per 3,000 square feet of low-density polyethylene provide a package with good structure. In this embodiment, the low-density polyethylene provides a good moisture barrier, although the precise composition of the polyethylene is not critical. Because conventional juice board contains about 6–8% moisture, it is important to have a moisture barrier, such as polyethylene, between the juice board and the buried EVOH layer.

The laminate of the type illustrated by FIG. 2 may be manufactured by conventional processes, using commercially available equipment. For example, an extruder having three extrusion heads may be used, wherein the first head extrudes polyethylene onto one side of the juice board, the second head extrudes polyethylene onto the opposite side of the juice board. A third head made up of three extruders provides three streams at one head, wherein a layer of EVOH is split and adhesive is disposed therebetween, and the resulting three layer extrusion is deposited on the laminated juice board.

Those skilled in the art will understand that other mechanisms could be used to make equivalent board laminates.

The outer layer serves as a heat-sealing member and is generally a thin layer of from about 0.4 to 1.0 mils of polyethylene, preferably 0.5 to 0.75 mils, having a density from about 0.910 to 0.950 grams per cubic centimeter and with a minimum melt temperature of 285° C. The thickness of this layer can vary with the economics and the application.

In the preferred embodiment, the polyethylene is a low-density polyethylene which is substantially free of long branched-chains. In general, the quantitative measure for the long branched-chain is expressed as a "G value" which is a ratio of the intrinsic viscosity of a branched-chain polyethylene divided by the intrinsic viscosity of a polyethylene having the same molecular weight. Generally the G value should be in the range of 0.9 through 1 and preferably close to 1. The density of the polyethylene should be within the range of about 0.910 through 0.945. The process by which the low-density polyethylene is prepared is not critical. As an example, representative production processes comprise conducting copolymerization of ethylene with an alpha olefin of 3 or more and preferably 4 or more carbon atoms, e.g., propylene, butane-1, and the like, as a random copolymerization component at a pressure of 7–45 kg/cm$^2$ (generally 2,000–3,000 kg/cm$^2$ in the case of a branched-chain low-density polyethylene) and at a temperature of 75°–100° C. (or higher in the case of branched-chain low-density polyethylene) employing a chromium based catalyst or a Ziegler catalyst. As the polymerization process, liquid phase processes or gas phase processes may be employed.

In the preferred embodiment of the present invention, a low-density polyethylene has a heat of fusion not greater than 25 calories per gram, and preferably in the range of between 5 and 25 calories per gram. Moreover, it is preferred that the polyethylene have a Young's modulus at 20° C. not greater than 22 kilograms per millimeter, and preferably between 5 and 22 kilograms per millimeter, in order to provide heat-sealability to the cartons fabricated from the barrier structure of the present invention. As those who are skilled in the art will understand, the heat of fusion and the Young's modulus may be affected by the particular copolymers which are used to make the polyethylene as well as the polymerization conditions under which the polymers are formed.

As is illustrated by FIG. 2, the juice board is sandwiched between two layers of low-density polyethylene. While the compositions of each polyethylene layer may be different, for economic reasons it is convenient to use the same material for both layers.

The barrier structure of the present invention may be employed in molded bottles using conventional coextrusion blow molding systems. Such equipment is available with 3–5 extruders specifically sized to provide high volume container production. This equipment is equipped with multiple heating zones which allow for the coextrusion of containers of up to 7 layers of thermoplastic materials which are coextruded at different temperatures to provide containers, wherein each resin is individually temperature controlled to provide precise thickness of layers coextruded.

PLASTIC BOTTLES

Figure 3:
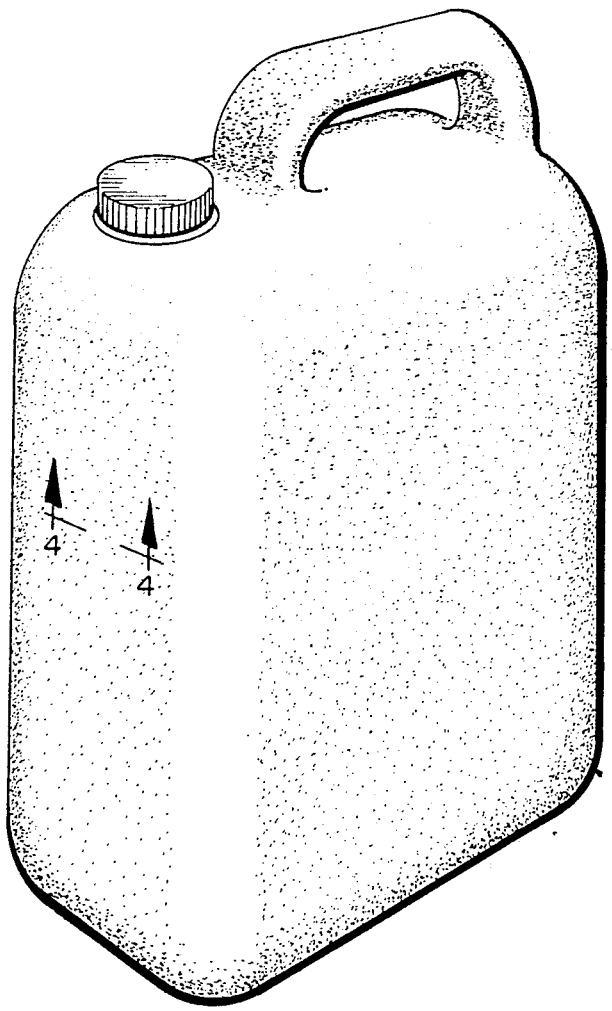
FIG. 3 is a perspective view of a plastic bottle embodiment of the present invention.

In another embodiment, the barrier structure of the present invention is coextruded and blow molded into a plastic bottle. This embodiment is illustrated by FIGS. 3 and 4. In FIG. 4, the bottle comprises exterior layer 30 made up of high-density polyethylene which is joined by adhesive layer 32 to the buried EVOH layer 34. This is joined by adhesive 36 to the reground high-density polyethylene layer 38. This in turn is joined by adhesive layer 40 to the inner layer of EVOH 42.

It is preferred generally to use high-density polyethylene as the structure providing portion of the plastic bottle. The bottle preferably has an overall thickness of no less than 10 mils, at the thinest point. Advantageously, the outer layer of the bottle may be about 3 mils of high-density polyethylene. In this embodiment, the moisture barrier structure which is interposed between the two EVOH layers may be reground high-density polyethylene/EVOH mixture, which is secured to the EVOH layers by an adhesive layer. A wide variety of blow molding adhesives may be used to join the various layers described above during the coextrusion process. Good results have been obtained using a polyolefin based thermoplastic adhesive sold under the tradename Bynel CXAE-208 by Dupont. The Plexar adhesives, described above, are suitable for adhesives for use in preparing coextruded, blow molded bottles.

Bottles of the type shown in FIGS. 3 and 4 may be fabricated by coextrusion blow molding techniques to provide a structure having the following layers and dimensions:

| | |
|---|---|
| High-density polyethylene | 5 mils; |
| Plexar Adhesive | .1 mil; |
| EVOH | .25 mils; |
| Plexar Adhesive | .1 mil; |
| Re-ground high-density polyethylene | 3.95 mils; |
| Plexar adhesive | .1 mil; and |
| EVOH | .5 mils. |

The present invention also contemplates the use of the barrier structure in combination with polycarbonate-polyester plastic bottles. In this embodiment, the two EVOH layers are separated by a layer of regrind which serves as a moisture barrier. Preferably adhesives are used to join the polyester to the EVOH layers. The outside of the bottle may be a mixture of 20% polycarbonate and 80% polyester, which also provides good moisture barrier properties. An adhesive layer may be used to join the polycarbonate/polyester mix to the EVOH layer. The use of the polycarbonate on the outside of the bottle gives the bottle an optically clear characteristic. The use of the barrier structure of the present invention provides a clear bottle with good flavor retention properties.

The following Examples will serve to illustrate the preparation and testing of composite barrier structures of the present invention, but it is understood that these Examples are set forth for illustrative purposes and many other barrier structures may be made by using suitable variations.

EXAMPLE 1

A juice board laminate as illustrated by FIG. 2 was produced. The laminate was made up of the following materials, read from the outside of the package, to the inside of the package:

| Material | Pounds Per 3,000 Sq. Ft. |
|---|---|
| Low-density polyethylene (50% gloss) | 12 |
| IPS-J board | 282 |
| Low-density polyethylene | 12 |
| EVOH copolymer | 3.25 |
| Coextrudible Plexar adhesive | 10 |
| Ethylene-vinyl alcohol copolymer | 3.25 |

The EVOH copolymer is a commercially available copolymer sold under the brand name Eval E, which contains 44% polyethylene. The Plexar adhesive is polyethylene based adhesive.

The above described laminate was converted into convention style cartons in pint, quart and half-gallon sizes. Conventional juice board (IPS-J board sandwiched between low-density polyethylene layers) was converted into conventional cartons in pint, quart and half-gallon sizes.

Figure 7:
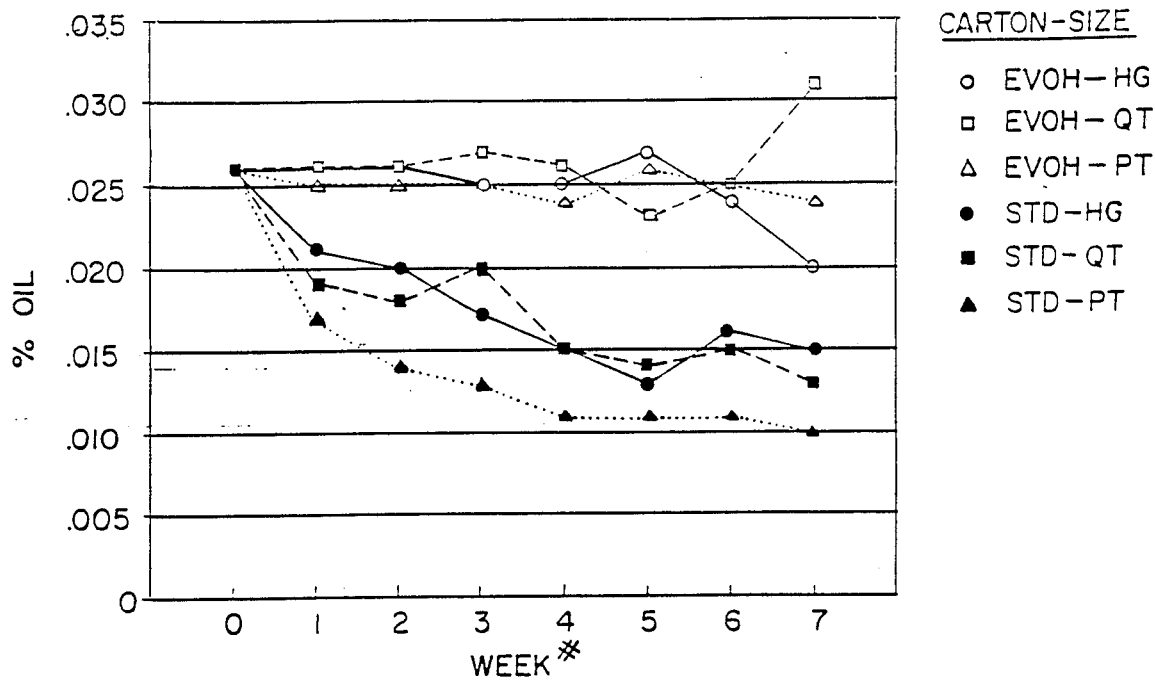
FIG. 7 is a graph of the oil content of orange juice stored in paper cartons at 35° F. for seven weeks.
Figure 8:
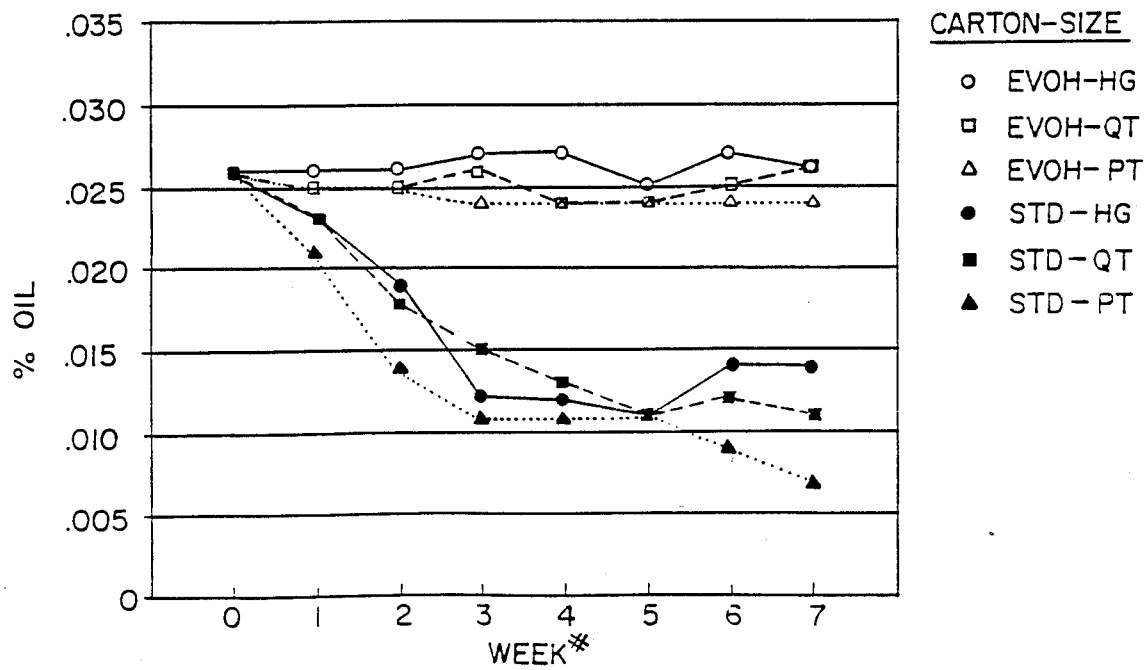
FIG. 8 is a graph of the oil content of orange juice stored in paper cartons at 45° F. for seven weeks.

Both the control cartons and cartons of the present invention were filled with the same fresh orange juice, sealed, and stored under identical conditions. One group of cartons were stored at 35° F., and a second group of cartons were stored at 45° F. for 7 weeks. Throughout 7 weeks the Vitamin C content and orange oil content of the stored orange juice was monitored. The results of the tests are presented in FIGS. 5 through 8. The unexpected superiority of the carton lined with the barrier structure of the present invention is apparent from the graphs comprising FIGS. 5 through 7.

The data from Example 1 indicates that the pint containers are not as effective as the larger containers with respect to retained Vitamin C and retained oils. The pint containers were made using a different carton construction. The pint size also provides a larger head space to volume ratio and greater surface-to-volume ratio, both of which contribute to flavor deterioration. The pint containers made with the barrier structure of the present invention produced better shelf life and flavor stability than conventional pint size juice board cartons.

The barrier structure of the present invention may be used to package a wide variety of food products. In addition to packaging orange juice, which is illustrated by the foregoing Example, the barrier structure of the present invention may be used to package potato chips, ketchup, and other liquid or semi-liquid foods. In its broadest embodiment, the barrier structure may be used to package any non-refrigerated shelf-stable products. For example, the barrier structure of the present invention may be used to package non-food products, such as flowers, herbicides, cigarettes, toothpaste and other materials, wherein it is essential to prevent oxygen from the air from interacting with the packaged product and at the same time prevent oils or other flavor bearing components (or other valuable components of the packaged product) from being absorbed by the package.

The barrier structure of the present invention may be used in a wide variety of packages. In addition to the cartons and bottles described above, the dual EVOH barrier structure of the present invention may be used in plastic bottles made using various coextrusion techniques, as well as in bags, cups, cans, sacks or packages of various physical shapes and dimensions. Such packages may be produced by coextrusion, thermoforming, blow molding lamination and other conventional processes.

The scope of the invention herein shown and described is to be considered only as illustrative. It will be apparent to those skilled in the art that numerous modifications may be made therein without departure from the spirit of the invention and the scope of the appended claims.

We claim:

1. A package for a product, said package containing a barrier structure, said barrier structure comprising:
   two layers of ethylene-vinyl alcohol copolymer;
   one layer of ethylene-vinyl alcohol positioned to contact a product within said package and adapted to function to limit oil absorption;
   a moisture barrier secured between said two ethylene-vinyl alcohol copolymer layers; and
   a moisture barrier secured to the non-product side of the second layer of ethylene-vinyl alcohol, said second layer adapted to function as an oxygen barrier.

2. A package for a product, said package including barrier structure, said barrier structure comprising:
   a first layer of ethylene-vinyl alcohol copolymer, said first layer secured between two moisture barrier layers, said first layer adapted to function as an oxygen barrier; and
   a second layer of ethylene-vinyl alcohol copolymer secured to one of said moisture barriers, said second layer being positioned to contact a product within said package, said second layer adapted to function as an oil absorption barrier.

3. A package comprising the barrier structure of claim 2 secured to a structural layer adapted to provide shape retaining properties to the package.

4. A package comprising the barrier structure of claim 3 secured to a structural layer, wherein said structural layer is secured between said ethylene-vinyl alcohol copolymer layers.

5. A package for food comprising:
   a structural layer adapted to provide shape retaining properties to the package;
   a barrier structure secured to said structural layer, said barrier structure comprising:
   a first layer of ethylene-vinyl alcohol copolymer, said first EVOH layer secured between two moisture barrier structures, said first layer adapted to function as an oxygen barrier; and
   a second layer of ethylene-vinyl alcohol copolymer secured to one of said moisture barriers, said second layer positioned to contact the packaged product, said second layer adapted to function as an oil absorption barrier.

* * * * *